United States Patent
Hart, Jr.

[11] 3,754,960
[45] Aug. 28, 1973

[54] HIGHLY PLASTICIZED QUIVERY PLASTIC MATERIAL WITH REPLENISHING FRICTION SURFACE AND METHOD OF PRODUCING THE SAME

[76] Inventor: Maurice W. Hart, Jr., 601 W. 27th St., Coral Gables, Fla. 33010

[22] Filed: July 1, 1971

[21] Appl. No.: 158,958

[52] U.S. Cl. ..................... 117/9, 117/16, 117/119.2
[51] Int. Cl. ............................................. B44c 1/08
[58] Field of Search ...................... 117/8, 9, 16, 32, 117/33, 119.2; 51/295, 298

[56] References Cited
UNITED STATES PATENTS

| | | | |
|---|---|---|---|
| 3,087,830 | 4/1963 | Schuller | 117/32 |
| 3,565,661 | 2/1971 | Harrison | 117/9 |
| 2,087,111 | 7/1937 | Mayall | 117/26 |
| 2,413,901 | 1/1947 | Abernathy | 117/26 |
| 2,689,801 | 9/1954 | D'Alelio | 117/9 |
| 3,366,503 | 1/1968 | Dillhoefer et al. | 117/138.8 E |
| 1,604,941 | 10/1926 | Hofmann | 117/9 |
| 2,308,624 | 1/1943 | Pouech | 117/33 |
| 2,567,186 | 9/1951 | Cross et al. | 117/16 |
| 2,748,019 | 5/1956 | Schramm | 117/28 |

FOREIGN PATENTS OR APPLICATIONS

| | | | |
|---|---|---|---|
| 677,116 | 12/1963 | Canada | 51/295 |

*Primary Examiner*—William D. Martin
*Assistant Examiner*—Shrive P. Beck
*Attorney*—David Rines and Robert H. Rines

[57] ABSTRACT

This disclosure relates to a novel highly plasticized quivery plastic member as of polyvinyl chloride, containing friction particles, such as sand or the like, mechanically temporarily trapped, but not wettingly secured, within a gradually cured surface of the member, with the particles being adapted, upon abrasion of the member, to dislodge out of said surface in a replenishing manner.

4 Claims, 1 Drawing Figure

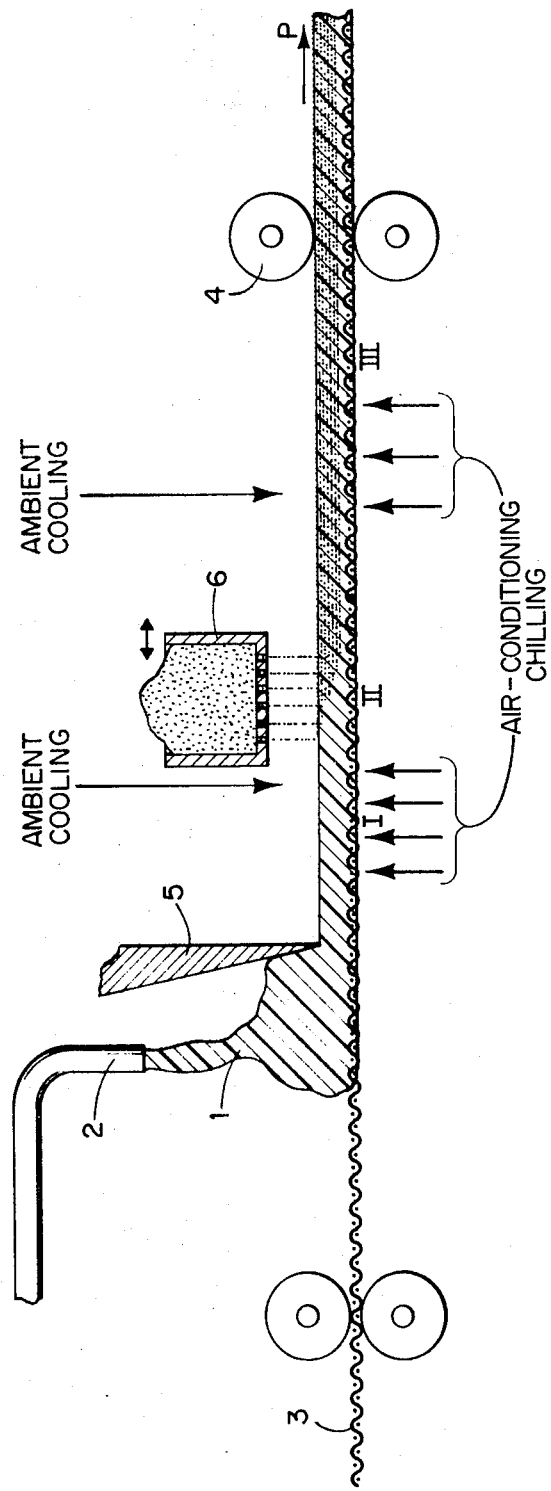

HIGHLY PLASTICIZED QUIVERY PLASTIC MATERIAL WITH REPLENISHING FRICTION SURFACE AND METHOD OF PRODUCING THE SAME

The present invention relates to highly plasticized quivery plastic materials and the like and methods of preparing the same, being more particularly, though not exclusively, directed to highly plasticized quivery polyvinyl chloride layers secured in the openings of fabric carriers and the like and in which the plasticizer-to-polyvinyl chloride ratio is at least substantially 400 parts to 100 parts, more or less.

There are instances, as in the application of such quivery plastic to roof coverings and the like, where the inherently smooth surface of such material can disadvantageously become slippery, particularly when wet, and thus dangerous or otherwise deleterious.

It is to the providing of a friction surface upon such materials, accordingly, that the present invention is primarily directed; it being essential, in accordance with the new and improved method and structure of the invention, that such surface remain friction-providing despite repeated wetting, drying and abrasion, and that, whatever is added to produce friction, does not deleteriously affect either the forming procedure or subsequent properties of the quivery plastic in use.

A further object of the invention is to provide a novel plastic material and method of more general utility, as well.

Other and further objects are explained hereinafter and are more particularly delineated in the appended claims. In summary, however, the invention contemplates a highly plasticized quivery plastic member having a rapidly cured first side and a more gradually cured second side containing temporarily mechanically trapped but non-wettingly secured particles non-reactive with said plastic and that provide a friction surface which, upon abrasion of the member, enables dislodging of the particles from said second side of the quivery member in a replenishing manner.

The invention will now be described with reference to the accompanying drawing, the single FIGURE of which illustrates a preferred method of producing the product of the invention.

Referring to the example illustrated in the drawing, molten highly plasticized polyvinyl chloride 1, maintained at about 300°–340°F, is shown ejected from a relatively confined outlet 2 upon a fabric or other openings-provided carrier layer 3, within the openings of which the plastic penetrates, to varying degrees, depending principally upon the temperature and the speed of drawing of the fabric 3 by the drive rolls 4 along the path indicated by the arrow P. The polyvinyl chloride resin was preferably mixed with at least 400 parts of plasticizer to each 100 parts of p.v.c., such as, for example, Monsanto Santicizer Type 140 (cresyl diphenyl phosphate) or 148 (alkyl aryl phosphate), or the like, and carried through a first gel state at about 240°F to a conversion and reliquified molten non-aqueous state in about the said 300°–340°F range. The molten mass is carried upon the fabric or other carrier 3 past a doctor blade 5, and, in accordance with the invention, is promptly subjected at region I to relatively rapid air-conditioned cooling directed against the under side of the plastic coating or layer through the fabric carrier 3. This effects relatively rapid setting and curing of the underside, including locking to the fabric carrier, which occurs as the plastic temperature is reduced through about 170°F. The upper side or surface of the plastic, however, is allowed more slowly and gradually to cool, as under ambient temperature, such that it is still molten at the immediately subsequent region II.

Rough, particulate sand, silicate or phosphate crystals or the like are, in accordance with the invention, sifted or applied from above, as at 6, in the region II. Such particles are not only non-reactive with the plastic and its plasticizer but are not wetted, such that, under the above conditions, they have been found limitedly to penetrate into the slowly cooling upper molten surface. Under these circumstances, when the upper surface has gradually cooled to about 170°F, as at region III, it has been discovered that the particles have become temporarily mechanically trapped but not secured principally in the upper layers of the now set quivery plastic covering (probably because of the minimal surface tension of the still molten upper layers of the highly plasticized mass and the neutral or near zero charge or negative charge of the particles in the highly excessively negatively charged molten plastic). It has further been found that, when the frictionalized quivery plastic article is abraded, repeatedly washed and dried, stepped upon, flexed or otherwise abused, this only causes the particles to become dislodged and ejected from the quivery surface in a long-lasting self-replenishing supply, providing an extended-life frictional surface effect.

Static coefficients of friction have been measured for the said approximately 400-to-100 ratio highly phosphate-plasticized polyvinyl chloride before-mentioned, formed in a 1/16 inch layer upon a fabric carrier for roofing. The material without the roughening particles of the invention, when wet with water, produced a coefficient of friction of about 0.128; while the same material embodying sand applied as herein taught had about three times this coefficient of friction.

Further modifications will occur to those skilled in this art and all such are considered to fall within the spirit and scope of the invention as defined in the claims.

What is claimed is:

1. A method of producing a self-replenishing friction surface on a quivery highly plasticized plastic member, that comprises, heating a mixture of plasticizer and polyvinyl chloride in a ratio of at least substantially 400 parts to 100 parts to form a highly plasticized molten plastic, flowing the highly plasticized plastic while molten along a predetermined path to form the member, rapidly chilling one side of the plastic only as it moves along said path in order to rapidly cure and set the same in the quivery state while more gradually cooling the other side, applying a stream of solid particles non-reactive with the plastic and its plasticizer and substantially non-wetting to the gradually cooling molten surface of the plastic on said other side at a region along said path, such that said particles limitedly penetrate the molten plastic at said other side, curing and setting the molten plastic on the said other side to the quivery state thereby temporarily mechanically trapping the particles therein but not wettingly securing the same, in order that, upon subsequent abrading of the quivery plastic member, the particles may become dislodged out of said other side in a replenishing manner.

2. A method as claimed in claim 1 and in which said flowing step is effected upon one side of an openings-provided carrier within the openings of which the molten plastic penetrates and becomes secured, and the said chilling is effected through the other side of the carrier.

3. A method as claimed in claim 1 and in which said particles are sand.

4. A method as claimed in claim 1 and in which said plastic is of high excess negative charge, and in which said particles have one of substantially zero charge and negative charge.

* * * * *